United States Patent [19]

Sano

[11] 4,331,224
[45] May 25, 1982

[54] HYDRAULIC SHOCK ABSORBER FOR VEHICLES

[75] Inventor: Shoichi Sano, Tokorozawa, Japan

[73] Assignee: Honda Giken Kogyo Kabushiki Kaisha, Tokyo, Japan

[21] Appl. No.: 132,524

[22] Filed: Mar. 21, 1980

[30] Foreign Application Priority Data

Mar. 22, 1979 [JP] Japan .............................. 54-37332[U]

[51] Int. Cl.³ .............................................. F16F 57/00
[52] U.S. Cl. ........................... 188/322.22; 188/322.17; 188/321.11; 280/668
[58] Field of Search .................... 188/311, 321, 322.17, 188/322, 322.22; 92/248, 249; 267/124, 8 R, 33; 280/668; 403/225

[56] References Cited

U.S. PATENT DOCUMENTS

| | | | |
|---|---|---|---|
| 3,070,392 | 12/1962 | Potter | 403/225 |
| 3,158,072 | 11/1964 | Detrez | 403/225 |
| 3,168,015 | 2/1965 | Pound | 92/249 |
| 3,346,272 | 10/1967 | Smith | 280/668 |
| 3,695,149 | 10/1972 | Eberhart | 92/248 |
| 3,701,402 | 10/1972 | Chelnokov et al. | 188/269 |
| 3,730,305 | 5/1973 | Fouts | 92/248 |
| 4,183,509 | 1/1980 | Nishikawa et al. | 267/8 R |
| 4,210,343 | 7/1980 | Shiomi et al. | 280/668 |

Primary Examiner—Bernard Nozick
Attorney, Agent, or Firm—Irving M. Weiner; Pamela S. Burt; John L. Shortley

[57] ABSTRACT

A hydraulic shock absorber for vehicles which includes a cylinder, a piston, a piston rod and a piston rod guide. In order to minimize noises which might otherwise be transmitted to the vehicular chassis through the piston rod, the piston rod is constructed of axially arranged divided piston rod members which are integrally connected through an elastic member. The piston rod guide may include radially arranged divided rod guide members which are integrally connected through an elastic member.

4 Claims, 1 Drawing Figure

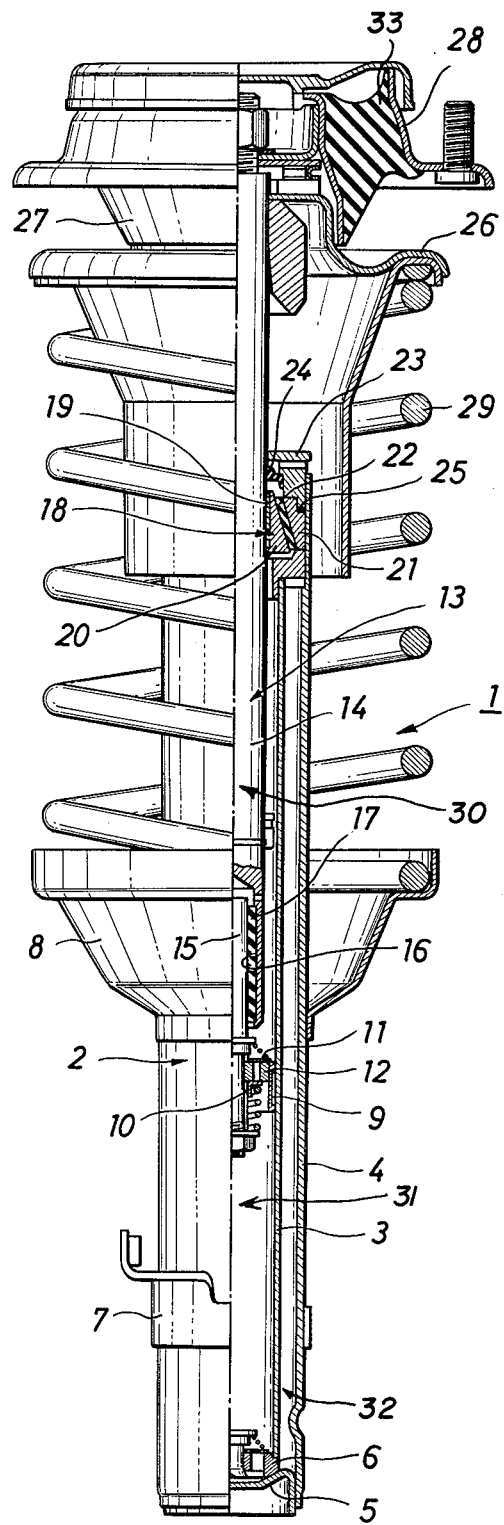

HYDRAULIC SHOCK ABSORBER FOR VEHICLES

BACKGROUND OF THE INVENTION

1. Field of the Invention

The present invention relates to a hydraulic shock absorber to be used as a suspension system for a vehicle.

2. Description of the Prior Art

A strut type suspension system for a vehicle is constructed such that a hydraulic shock absorber has a piston rod thereof supported on a chassis and a cylinder thereof supported on a wheel through a knuckle so that hydraulic attenuation may be established by the confined oil in response to the sliding movements of a piston fitted in the cylinder, thereby damping and absorbing the shocks coming from a road.

In the hydraulic shock absorber of this kind, friction noises are generated between a piston and cylinder, and between a piston rod and a rod guide during the axial sliding movements of the piston and its rod. In addition, there are generated flapping noises caused by the opening and closing operations of a check valve flapper which is carried on the piston, and concussion noises caused by the fluctuations in the oil pressure. These noises are transmitted to the chassis through the piston rod thereby causing the noises and vibrations. Especially in an otherwise substantially noise-free vehicle in which the prevention and restraint of the noises produced by other causes is of superior quality, the aforementioned noises become clear and prominent to an undesirable level. Moreover, even if the spring of the suspension system is made softer, the aforementioned frictions at the piston, bearing and other parts are directly transmitted through the piston rod to a spring stopper. This constitutes an obstacle to improvement of driving comfortability.

The present invention has been conceived with a view toward effectively solving the aforementioned problem with noises in the vehicular hydraulic shock absorber.

SUMMARY OF THE INVENTION

It is an object of the present invention to provide a hydraulic shock absorber for vehicles which is advantageous in that the friction noises due to the sliding movements of a piston and/or the flapping noises due to the opening and closing operations of a valve are insulated in a piston rod so that the noises can be prevented from being transmitted from the rod to the chassis so as to effectively prevent the noises and vibrations.

Another object of the present invention is to provide a vehicular hydraulic shock absorber which is advantageous in that the shocks resulting from road surface roughness can be prevented from being transmitted to the chassis so as to improve the driving comfortability.

A further object of the present invention is to provide a vehicular hydraulic shock absorber which is further advantageous in that the bending force is absorbed in a rod guide as well as the piston rod, while the piston rod is prevented from being pinched, to smoothen the operations of the piston rod, whereby the driving comfortability can be further improved.

The present invention provides a vehicle hydraulic shock absorber in which a piston rod includes divided piston rod members which are in axial arrangement and are integrally connected through an elastic element of rubber or the like.

The present invention provides further a vehicle hydraulic shock absorber, in which a rod guide also includes divided members which are in radial arrangement and integrally connected through an elastic member of rubber or the like.

Other objects and advantages of the present invention will become more apparent from the following description of a preferred embodiment thereof with reference to the accompanying drawing.

BRIEF DESCRIPTION OF THE DRAWINGS

The single drawing FIGURE is a view showing a hydraulic shock absorber according to the present invention with one-half thereof being shown in a longitudinal section.

DETAILED DESCRIPTION OF THE PREFERRED EMBODIMENT

A cylinder 2 of a shock absorber 1 is made to have a dual construction including inner and outer cylinder members 3 and 4 which define a reservoir chamber 32 therebetween, the bottoms of which are closed by a bottom piece 5. A bottom check valve 6 is arranged at the lower end of the inner cylinder member 3 which provides a communication between the interior of the inner cylinder member 3 and the reservoir chamber 32 through an unshown bottom passage. On the other hand, the outer cylinder 4 is equipped at its lower portion with a wheel mount bracket 7, for mounting on a knuckle or the like of a wheel, and at the center portion of the outer cylinder member is provided a spring seat 8.

There is slidably fitted in the inner cylinder member 3 a piston 9 which partitions the interior of the inner cylinder 3 into upper and lower chambers 30 and 31, respectively. The piston is equipped with check valves 10 and 11 which are independently opened in the compression and expansion strokes, and is formed with a passage 12 extending vertically therethrough. The constructions and arrangements of the valves and passage are arbitrary in accordance with the relationships with the bottom valve 6.

The piston 9 thus equipped with the valve mechanism is connected to a piston rod 13 which consists of axially arranged piston rod members 14 and 15. The longer member 14 located at an upper connecting position is formed at its lower portion with a recess 16 which is opened downwardly and in which is fitted the lower shorter member 15 at its middle and upper portions. There is sandwiched between the inner wall of the recess 16 and the outer wall of the lower piston rod member 15 both facing each other in the radial direction an elastic element, e.g., a cylindrical element 17 of rubber which is fixed at its radially outer and inner sides to the inner wall of the recess 16 and to the outer wall of the member 15, respectively by baking treatment, and is finally caulked thereto. The piston 9 is attached to the lower end of the lower member 15 which is connected to the upper member 14 through the elastic element 17 of rubber or the like, thereby being prevented from contact in a metal-to-metal relationship with the upper member 14.

There is mounted on the upper end portions of the inner and outer cylinder members 3 and 4 a collar-shaped rod guide 18 which acts as a spacer between the upper end portions of the inner and outer cylinder members 3 and 4 and connects the two members. The guide 18 has its diametrically inner surface equipped with a guide sleeve 19 which is made of a material having a low frictional constant so that the piston rod 13 may be slidably guided. The guide 18 includes radially arranged inner and outer members 20 and 21 having their connecting portions or facing walls formed into tapered shapes in corresponding relation to each other, by way of an example. An elastic element 22 is sandwiched between the inner and outer guide members 20 and 21 and is fixed thereto by baking treatment, thereby integrating the members 20 and 21.

The upper end portion of the outer cylinder member 4 is covered with a cap 23, in which is mounted a dust seal 24 at the radially inner portion thereof. A seal element 25 is sandwiched between the cap 23 and the rod guide 18. And, the rod 13 has its upper portion extending upwardly through the cap 23. A spring seat 26 and a dust cover 27 are attached to the upper end of the piston rod 13, to which is also attached a chassis mount bracket 28 through a mount rubber element 33. A coil spring 29 is mounted under compression between the spring seat 26 and the spring seat 8 at the cylinder side such that it is wound about the cylinder 2 and the dust cover 27.

The operations of the hydraulic shock absorber according to the present invention will now be described in the following. In response to the sliding movements of the piston 9, the oil in the upper and lower chambers 30 and 31 in the inner cylinder member 3, and in the reservoir chamber 32 between the inner and outer cylinder members 3 and 4, is pressurized so that the hydraulic shock absorbing effect is obtained by the compression and expansion of the piston 9.

In the above operation, the valve mechanisms 10 and 11 of the piston 9 are independently opened by the reciprocal movements of the latter so that flapping noises are generated. Moreover, friction noises are also generated by the sliding movements of the piston 9 within the inner cylinder member 3. On the other hand, the concussions due to the fluctuations in the hydraulic pressure, especially that acting upon the lower side of the piston 9 are propagated to the piston 9 and to the lower portion of the piston rod 13.

According to the present invention, the piston rod 13 supporting the piston 9 is divided into the two piston rod members 14 and 15, between which is sandwiched the elastic element 17 so that they are prevented from contacting in metal-to metal relation. As a result, the noises such as the friction noises of the piston and the flapping noises of the valves on the piston are absorbed and attenuated by the elastic element 17 so that the resultant noises and vibrations which might otherwise be transmitted to the upper piston rod member 14 to be attached to the chassis can be prevented. On the other hand, the vibrations and noises of the inner and outer cylinder members 3 and 4 are transmitted to the upper piston rod member 14 through the rod guide 18 connected thereto, but they are absorbed and attenuated thereat, because the rod guide 18 is divided into two members 20 and 21 which are connected through the elastic element 22, so that the transmissions of the vibrations and noises to the chassis can also be restrained and prevented. As a result, it is possible to provide a highly effective hydraulic shock absorber having minimal vibration and noises levels. Because the elastic element 22 of the rod guide 18 is formed into a tapered-ring shape in accordance with the correspondingly inclined facing surfaces of the members 20 and 21, it bears against not only the shearing force but also the compression force developed by the rise of the internal pressure. Accordingly, the hydraulic shock absorber of the present invention has superior durability.

Moreover, the elastic element 17 between the upper and lower piston rod members 14 and 15 provides a further advantage in that fine shocks from the road surface, which produce forces acting on the shock absorber to a lesser extent than the frictional forces between the piston 9 and the inner cylinder member 3, can be absorbed through the deformation of the elastic element 17. In other words, the upper piston rod member 14 and the cylinder 2 can extend and contract relative to each other within the range of deformation of the elastic element 17 so that the vehicle wheel can follow road surface roughness, while the piston 9 and the lower piston rod 15 remain unmoved, thereby generating no noises from the piston.

In case, on the other hand, a large bending moment is exerted upon the piston rod 13 which will cause the elastic deformation thereof, the elastic element 22 at the rod guide 18 is deformed so that it can be prevented from being picked by the guide sleeve 19. And, the generation of the picking phenomena between the piston 9 and the inner cylinder member 3 can be prevented through the deformation of the elastic element 17. Even under this particular condition, consequently, the smoothness in the operations is retained so that the driving comfortability can be improved, and the piston rod 13, the piston 9, the cylinder 2 and the rod guide 18 are prevented from being damaged so that the lifetime and durability of the shock absorber can be improved.

Although only one embodiment has been described hereinabove, the elastic elements should not be limited to those made of rubber, as in the above, but may be readily made of a non-metallic material, and can be made of a synthetic resin or the like. Moreover, the division of the piston rod should not be limited to a twofold one, and the division of the rod guide should also not be limited to the particular construction thus far described.

What is claimed is:

1. In a hydraulic shock absorber for vehicles, comprising:
    a cylinder including inner and outer cylinder members having a chamber defined therebetween;
    a bottom check valve operably arranged at the lower end of said cylinder to provide communication between the interior of said inner cylinder member and said chamber;
    a wheel mount barcket provided at a lower portion of said outer cylinder member for mounting on a wheel support member of a vehicle;
    a piston slidably fitted in said cylinder, said piston including a check valve mechanism;
    a piston rod supporting said piston, the upper end of said piston rod extending outside said cylinder; and
    a chassis mount bracket provided at said upper end of said piston rod;
    the improvement wherein:
    said piston rod comprises upper and lower piston rod members integrally fixed to each other at respective connecting portions thereof;
    said upper and lower piston rod members are isolated from contact with each other by a first elastic element disposed between said respective connecting portions of said upper and lower piston rod members;

a rod guide is provided at an upper end portion of said inner and outer cylinder member and has said piston rod slidably received therethrough; and said rod guide includes radially inner and outer members integrally fixed to each other at respective connecting portions thereof and isolated from contact with each other by a second elastic element disposed between said respective connecting portions.

2. A hydraulic shock absorber according to claim 1, wherein:

said upper and lower piston rod members are connected in the vicinity of said piston.

3. A hydraulic shock absorber according to claim 1, wherein:

said lower piston rod member is fitted in said upper piston rod member; and said first elastic element is sandwiched between said connecting portions of said upper and lower piston rod members, said connecting portions comprising portions of said upper and lower piston rod members facing each other in the radial direction.

4. A hydraulic shock absorber according to claim 1, wherein:

the radially facing walls of said inner and outer rod guide members are formed to have a tapered shape; and said second elastic element is sandwiched between said connecting portions of said inner and outer rod guide members, said connecting portions comprising the inner and outer tapered walls of said rod guide members.

* * * * *